United States Patent

Gruenstern et al.

[11] Patent Number: 5,338,624
[45] Date of Patent: Aug. 16, 1994

[54] THERMAL MANAGEMENT OF RECHARGEABLE BATTERIES

[75] Inventors: Robert G. Gruenstern, Muskego; Ronald J. Bast, Greendale, both of Wis.; Julio A. Aldecoa, Santa Cruz; Lawrence F. Miller, Santa Clara, both of Calif.

[73] Assignee: Globe-Union Inc., Milwaukee, Wis.

[21] Appl. No.: 14,804

[22] Filed: Feb. 8, 1993

[51] Int. Cl.⁵ ............................................. H01M 2/02
[52] U.S. Cl. ............................... 429/120; 429/148; 429/157; 429/162
[58] Field of Search ................ 429/120, 148, 157, 162

[56] References Cited

U.S. PATENT DOCUMENTS

| 4,107,402 | 8/1978 | Dougherty et al. | 429/120 |
| 4,996,128 | 2/1991 | Aldecoa et al. | |
| 5,015,545 | 5/1991 | Brooks | 429/99 |
| 5,212,024 | 5/1993 | Klink et al. | 429/72 |

Primary Examiner—Prince Willis, Jr.
Assistant Examiner—M. Nuzzolillo
Attorney, Agent, or Firm—Foley & Lardner

[57] ABSTRACT

Thermal management of flat pack rechargeable batteries is accomplished by providing extensions on individual cell housing components, which extensions are connected to provide open air channels between individual cells. In an alternate embodiment of the invention, cells within the stack are filled with a thermally conductive liquid, such as a silica gel, to assist in heat dissipation from adjacent cells.

11 Claims, 2 Drawing Sheets

THERMAL MANAGEMENT OF RECHARGEABLE BATTERIES

BACKGROUND OF THE INVENTION

1. Field Of the Invention

The present invention relates generally to the art of rechargeable batteries and more particularly to the thermal management of battery cells.

2. Description of the Prior Art

Small rechargeable batteries are becoming increasingly important with the continuing development of portable electronic appliances, such as uninterruptible power systems (UPS). The batteries which are used with such devices are frequently referred to as flat pack batteries. It is highly desirable that such batteries be compact and light in weight yet have a high storage capacity.

Advances have been made in this technology in recent years, even using conventional lead-acid battery technology. Lead-acid batteries typically suffer from weight disadvantages due to the weight of the plate materials (lead plates and lead-containing active materials) and the weight of the containers which are required to hold the plates and electrolyte. Lead-acid batteries, however, have very good power delivery characteristics and may be repeatedly recharged and even overcharged, with only minimal damage to the cells. Moreover, the power curve of lead-acid batteries is relatively predictable. Such features are not readily achievable with other batteries, such as nickel cadmium batteries.

One type of lead-acid battery is the recombinant battery which differs from conventional lead-acid batteries (for example, automobile batteries) in that there is no flowing electrolyte in the system. Substantially all of the electrolyte is maintained in separator material, typically made of a glass fiber mat, located between the plates. The gasses evolved during the electrochemical reactions which take place in lead-acid batteries are absorbed and recombined within the battery rather than being vented in the normal case. With such systems, the battery can be sealed and made maintenance free. Other recombinant systems still use valves to relieve any undesirable build-up of pressure within the cells of the battery.

One recent development in the field of recombinant lead-acid batteries is described in U.S. Pat. No. 4,996,128 issued Dec. 26, 1991 to Aldecoa and Miller entitled "Rechargeable Battery" (hereafter, the "'128 patent"). The battery described in this patent includes a thin plastic casing having generally rectangular top and bottom portions, the casing including lead foil sheets for the positive and negative plates, each foil being pasted with an appropriate active material. Separator layers are placed between the active material. Another embodiment is described, wherein a single positive plate is located at the center of the casing, while two negative plates are disposed on either side, the latter being separated from the positive plate by layers of separator material. Further embodiments are described, including multi-layer batteries of the bipolar variety.

Common features of the batteries described in this patent are the support members which extend through the plates. The support members in the illustrated embodiments are plastic pins which may extend from one or the other of the casing portions, which pass through the plates and are attached to the opposite casing portion (for example, by vibration welding). Alternatively, pin segments from each casing component may pass partially through the cell and are joined at their tips by an appropriate process such as vibration welding. The support members are provided in a pattern which insures even support and which permits even compression of the battery components when the periphery of the casing portions are sealed. Other recombinant lead-acid batteries are described in the background section of the aforementioned '128 patent. That patent is specifically incorporated herein by this reference.

While the battery systems described in the '128 patent provide numerous advantages over prior art systems, one drawback exists in connection with the thermal management of those batteries. The problem is particularly pronounced when a plurality of individual cells are stacked, one on top of the other, and there is no effective way of dissipating heat, particularly from the intermediate cells. A battery system which would overcome that drawback would represent a significant advance in this technology.

SUMMARY OF THE INVENTION

The present invention features thermal management of rechargeable batteries, especially those of the flat pack type. The present invention also features a way of accomplishing thermal management using components which are easily mated to components used to form the battery cells. The invention further features techniques for heat dissipation using air as the cooling medium or a thermally conductive gel to facilitate dissipation of heat from adjacent cells.

How the features of the present invention are accomplished will be described in the following detailed description of the preferred embodiment, taken in conjunction with the drawings. Generally, however, they are accomplished by providing heat dissipation segments between adjacent cells of a stacked battery. The segments may include air passages for allowing cooling of the adjacent surfaces of battery cells or may include an enclosed compartment filled with a thermally conductive material, such as silica gel, to facilitate the dissipation of heat from adjacent cells through the walls of the enclosed segment.

In the most preferred form of the invention, the features are accomplished, when using air as the cooling medium, by providing extensions on battery cell casings, which extensions, when connected, form an air space between adjacent cells. In the embodiment of the invention using a thermally conductive liquid to dissipate heat, a cell which otherwise would contain electrode plates, separators and electrolyte contains the thermally conductive material, thereby facilitating heat dissipation.

Other ways in which the features of the invention are accomplished will become apparent to those skilled in the art after reading the remainder of this specification.

DESCRIPTION OF THE DRAWINGS

In the various FIGURES, like reference numerals are used to indicate like components.

DETAILED DESCRIPTION OF THE PREFERRED EMBODIMENT

Before proceeding to the detailed description of the drawings, several general comments are warranted with regard to the scope and applicability of the present invention. First, while the illustrated battery is shown to include three cells and two heat dissipation areas, the number of either may vary. Accordingly, the particular battery construction is for purposes of illustration rather than limitation.

Second, the battery components within each individual cell may vary, and may include the various foil, active material and separators shown in the '128 patent, which patent disclosure is specifically incorporated herein by reference. For purposes of illustration only, the preferred embodiment includes cells which have a central lead foil substrate pasted on both sides with positive active material and a glass fiber separator material on either side thereof. Two negative electrodes are adjacent the separator, each including a lead foil substrate and a layer of negative active material.

Third, while individual cells are described and illustrated, the battery could be constructed using the internal partition technique described and claimed in commonly owned, co-pending application Ser. No. 0810/04,784, filed on Feb. 8, 1995 and entitled "Multiplei Cell Flat Pack Battery and Short Protection Therefor".

Figure 1:
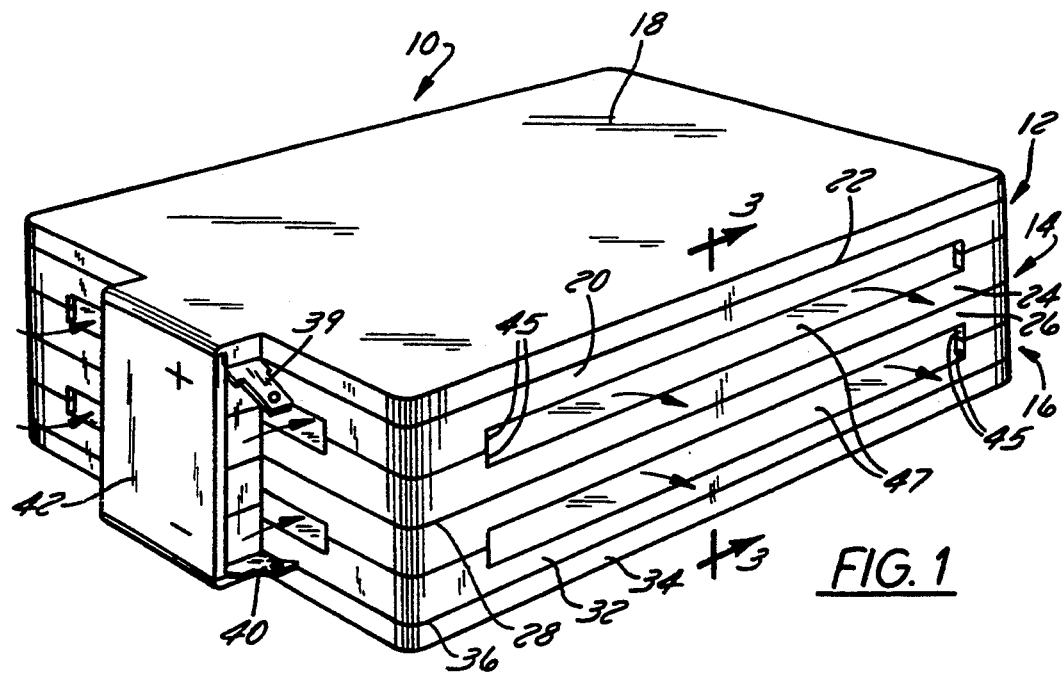
FIG. 1 is a perspective view of a multi-cell battery including three battery cells and a pair of air flow heat dissipation segments.

Fourth, while one particular configuration for the extensions is illustrated in FIG. 1, namely the use of corner extensions, other configurations, such as extensions along the sides, could be used to provide the spacing to allow air to flow between adjacent battery cells.

Proceeding first to an explanation of FIG. 1, a three cell battery 10 is illustrated. The battery cells themselves are illustrated generally at 12, 14 and 16, battery cell 12 being formed by an upper casing component 18 forming the top of the battery and a lower casing component 20 forming the bottom of the first cell 12. The two casing components of the cell 12 are joined along a line 22. The materials preferred for constructing the battery casings are moldable, thermoplastic resins, such as ABS (acrylonitrile-butadiene-styrene), but other materials known in the battery art can be used (e.g., polycarbonates or high density polyethylene). The preferred technique for joining the components is vibration welding along the facing edges of the two casing halves.

As will be explained in connection with FIG. 3, a plurality of electrodes are present in each of the cells 12, 14 and 16, and support members such as those described in the '128 patent may also be included.

The second cell 14 is located beneath cell 12 and is formed by an upper casing 24 and a lower casing component 26. Casings 24 and 26 are joined along the line 28.

The third cell 16 is constructed from an upper casing 32 and a lower casing 34, the latter forming the bottom of the illustrated battery. These latter components are joined along line 36.

Terminals 39 and 40 are provided at the left end of the illustrated battery 10, as is an end cap 42 covering the inter-cell connections and valves (not shown), which in and of themselves do not form part of the present invention.

Thermal management of battery 10 is accomplished by providing extensions 45, two of which are numbered, i.e., at the left front corner of casing 20 and at the right corner of casing 32. Extensions are provided to space the cells 12, 14 and 16 from one another and from a pair of air gaps 47. In the illustrated configuration, extensions are provided on the bottom of casing 20, on the top of casing 24, on the bottom of casing 26 and on the top of casing 32. The top and bottom 18 and 34 do not have such extensions as they are not needed for spacing purposes. The height of the spacing is not particularly critical as long as it is sufficient to allow air movement (as illustrated by the air flow arrows) between the adjacent cells to assist in the dissipation of heat from the confronting surfaces of casings 24 and 26 and the confronting surfaces of casings 28 and 32. Preferably, the extensions are integrally molded with the casing.

It is also not critical that the extensions 45 be located at the corners, as in the illustration. For example, extensions could be provided along each of the three sides (other than the side including the terminals 39 and 40 and cap 42) and leaving the corners open. This structure would provide the required structural rigidity for the battery and the open air passages between the cells.

Figure 2:
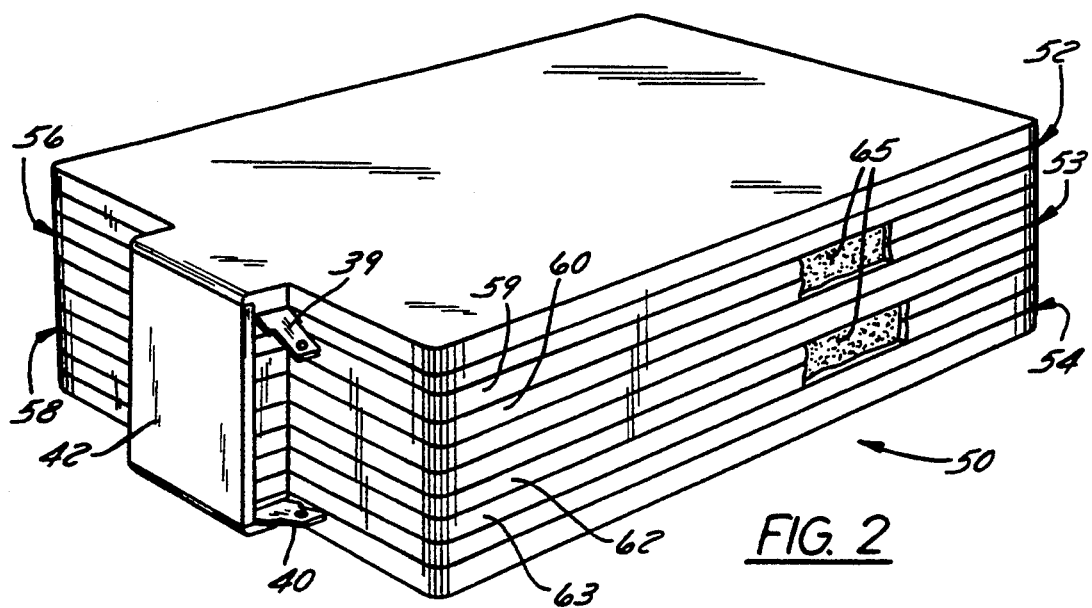
FIG. 2 is a perspective view of the battery shown in FIG. 1, wherein the air flow segments are replaced by enclosed chambers containing thermally conductive materials, such as the gel illustrated in cutaway portions thereof.

Another technique for thermal management is illustrated in FIG. 2 where battery 50 is shown to include three cells 52, 53 and 54. The individual cells will not be described in detail as they are generally similar to the casing and cell components of FIG. 1, except that instead of providing extensions on certain of the casing components, additional cells 56 and 58 are used. Each is formed from an upper and a lower casing element. For example, cell 56 is formed from an upper casing element 59 and a lower casing element 60, while cell 58 is formed from an upper casing element 62 and a lower casing element 63. These casings are enclosed and contain a thermally conductive liquid, such as a silica gel. See the cutaway portions of cells 56 and 58 and the reference numeral 65. One preferred type of thermally conductive gel is made from water combined with precipitated or fumed silica in an amount of 3 to 8 weight percent. The silica preferably has a particle size in the range of about 4 to 200 microns. Other suitable thermally conductive materials can be substituted for the gel in this detailed description.

Figure 3:
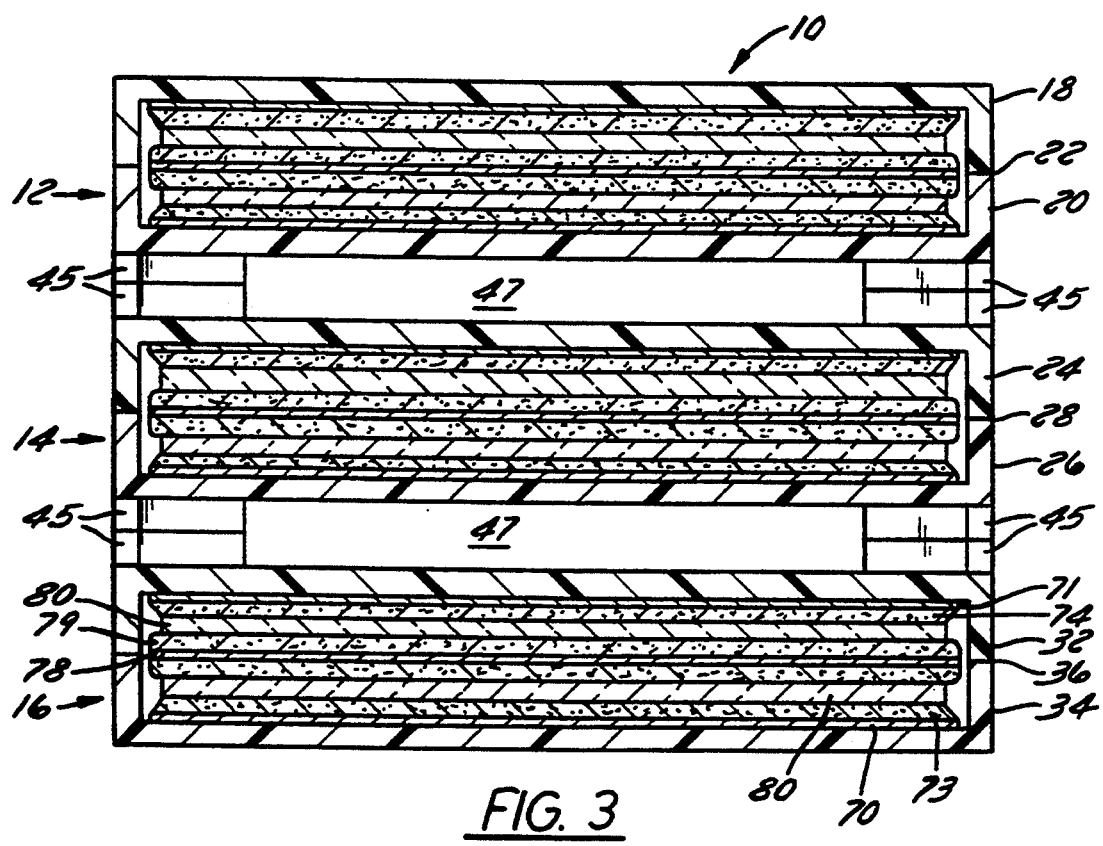
FIG. 3 is a section taken along the line 3—3 of FIG. 1.

Referring next to FIG. 3, a cross-section of battery 10, the air spaces 47 are clearly illustrated between cells 12, 14 and 16. The electrode components in one of the cells will be described, it being understood that the electrode configurations in the other cells are identical. It is also appropriate at this point to again mention that the particular electrode configuration in any cell can be varied widely, including the use of support members, such as pins, as described in the '128 patent. In cell 16, a pair of lead foils 70 and 71 are located at the top and bottom of the cell, each of which is pasted with a layer of negative active material 73 and 74, respectively. At the center of cell 16 is a foil 78, coated on both sides with a layer of positive active material 79 to form the positive electrode. Separator material 80, such as glass mat separator, is provided between the confronting and spaced apart layers of active positive and negative material. The electrolyte which would be used is lead-acid battery cells is not illustrated.

While the present invention has been described in connection with certain preferred embodiments, it is not to be limited thereby but is to be limited solely by the scope of the claims which follow.

We claim:

1. A battery including a plurality of cells, each cell including casings containing electrode components, said cells being joined to one another to form a battery stack, and projections on at least some of the casings to space one casing from an adjoining casing and providing an air space for heat dissipation between at least two adjacent cells.

2. The battery of claim 1 wherein the casings for each cell comprise generally planar top and bottom surfaces and wherein the projections are provided on at least one of the surfaces.

3. The battery of claim 2 wherein the casings are rectangular and the projections are provided at the corners thereof.

4. The battery of claim 1 wherein the casings are made from a thermoplastic, moldable resin and wherein the projections are joined by vibration welding.

5. The battery of claim 1 wherein at least two air spaces are formed within the battery stack.

6. A battery stack comprising a plurality of casings containing electrode components, and at least one additional casing containing thermally conductive material located between at least one pair of adjacent casings containing electrode components.

7. The battery of claim 6 wherein the thermally conductive material is a gel.

8. The battery of claim 7 wherein the thermally conductive gel is includes silica.

9. The battery of claim 6 wherein each casing is constructed from a moldable, thermoplastic resin.

10. The battery of claim 9 wherein the resin is an ABS resin.

11. A rechargeable, flat pack battery comprising a plurality of, flat cells each including a casing prepared from moldable, thermoplastic resin, and electrode components containing;

means for connecting the casings together and for providing an air space between at least two adjacent and spaced apart cells;

positive and negative electrodes, separator material and electrolyte in each casing; and the air space being open to the exterior of the battery to permit dissipation of heat from adjacent casings.

* * * * *